United States Patent
Schilling et al.

(10) Patent No.: US 7,344,191 B2
(45) Date of Patent: Mar. 18, 2008

(54) CRASH-ACTIVE HEAD RESTRAINT

(75) Inventors: Jürgen Schilling, Boechingen (DE); Daniel Hippel, Winnweiler (DE); Ralf Münster, Kaiserslautern (DE); Norbert Heeg, Dahn (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/655,949

(22) Filed: Jan. 19, 2007

(65) Prior Publication Data

US 2007/0152482 A1 Jul. 5, 2007

Related U.S. Application Data

(63) Continuation of application No. PCT/EP2005/006086, filed on Jun. 7, 2005.

(30) Foreign Application Priority Data

Jul. 22, 2004 (DE) .................. 10 2004 035 582

(51) Int. Cl.
*B60N 2/42* (2006.01)
(52) U.S. Cl. ................................. 297/216.12
(58) Field of Classification Search ............ 297/216.12
See application file for complete search history.

(56) References Cited

U.S. PATENT DOCUMENTS

| | | |
|---|---|---|
| 3,586,366 A | 6/1971 | Patrick |
| 3,838,870 A | 10/1974 | Hug |
| 4,511,180 A | 4/1985 | Klaus |
| 4,668,014 A | 5/1987 | Boisset |
| 4,720,146 A | 1/1988 | Mawbey et al. |
| 5,011,225 A | 4/1991 | Nemoto |
| 5,290,091 A | 3/1994 | Dellanno et al. |
| 5,468,045 A | 11/1995 | Weber |
| 5,738,412 A | 4/1998 | Aufrere et al. |
| 5,820,211 A | 10/1998 | Heilig et al. |
| 5,934,750 A | 8/1999 | Föhl |
| 6,019,424 A | 2/2000 | Rückert et al. |
| 6,074,011 A | 6/2000 | Ptak et al. |
| 6,079,776 A | 6/2000 | Breitner et al. |
| 6,082,817 A | 7/2000 | Müller |
| 6,088,640 A | 7/2000 | Breed |

(Continued)

FOREIGN PATENT DOCUMENTS

DE 39 00 495 A1 7/1990

(Continued)

*Primary Examiner*—Sarah B. McPartlin
(74) *Attorney, Agent, or Firm*—Womble Carlyle Sandridge & Rice, PLLC

(57) ABSTRACT

In the case of a head restraint (1) for a vehicle seat, with a support (5), at least two rockers (15, 25) which are arranged movably on the support (5) and are pivotable about horizontal spindles (7, 17), an impact element (13) which is coupled to the rockers (15, 25) and, with the rockers (15, 25) and the support (5), forms at least one four-bar linkage (31), and a spring (21) as an energy accumulator which drives the four-bar linkage (31) in the event of a crash, so that the impact element (13) extends forward out of a starting position into a crash position, at least one leg (25) of the spring (21) forms one of the rockers.

22 Claims, 1 Drawing Sheet

U.S. PATENT DOCUMENTS

| | | |
|---|---|---|
| 6,203,105 B1 | 3/2001 | Rhodes, Jr. |
| 6,213,548 B1 | 4/2001 | Van Wynsberghe et al. |
| 6,270,161 B1 | 8/2001 | De Filippo |
| 6,474,733 B1 | 11/2002 | Heilig et al. |
| 6,478,373 B1 | 11/2002 | Hake et al. |
| 6,623,073 B2 | 9/2003 | Schäfer et al. |
| 6,715,829 B2 | 4/2004 | Svantesson et al. |
| 6,779,840 B1 * | 8/2004 | Farquhar et al. ....... 297/216.12 |
| 7,070,235 B2 | 7/2006 | Schilling et al. |
| 7,108,320 B2 * | 9/2006 | Schafer et al. ......... 297/216.12 |
| 2001/0040396 A1 | 11/2001 | Kreuels et al. |
| 2003/0057758 A1 | 3/2003 | Baumann et al. |
| 2004/0195872 A1 | 10/2004 | Svantesson |
| 2005/0077762 A1 | 4/2005 | Kraemer et al. |
| 2005/0116515 A1 | 6/2005 | Schlierf et al. |
| 2005/0127726 A1 | 6/2005 | Schilling et al. |
| 2006/0012226 A1 | 1/2006 | Schafer et al. |
| 2006/0071518 A1 | 4/2006 | Hippel et al. |

FOREIGN PATENT DOCUMENTS

| | | |
|---|---|---|
| DE | 296 03 467 U1 | 6/1996 |
| DE | 296 14 238 U1 | 12/1996 |
| DE | 197 07 998 A1 | 9/1998 |
| DE | 197 57 533 A1 | 10/1998 |
| DE | 299 07 245 U1 | 8/1999 |
| DE | 199 51 966 A1 | 5/2001 |
| DE | 100 01 329 A1 | 7/2001 |
| DE | 100 04 766 A1 | 8/2001 |
| DE | 100 26 978 C1 | 10/2001 |
| DE | 100 47 406 A1 | 4/2002 |
| DE | 699 02 150 T2 | 11/2002 |
| DE | 102 60 582 B3 | 6/2004 |
| EP | 0 974 484 B1 | 1/2000 |
| EP | 0 976 608 A1 | 2/2000 |
| EP | 1 160 135 B1 | 12/2001 |
| EP | 1 193 114 B1 | 4/2002 |
| JP | 10278648 | 10/1998 |
| JP | 11321502 | 11/1999 |
| WO | WO 98/24652 | 6/1998 |
| WO | WO 01/12465 A1 | 2/2001 |
| WO | WO 03/084777 A1 | 10/2003 |
| WO | WO 2004/056606 A1 | 7/2004 |
| WO | WO 2004/108472 A1 | 12/2004 |

* cited by examiner

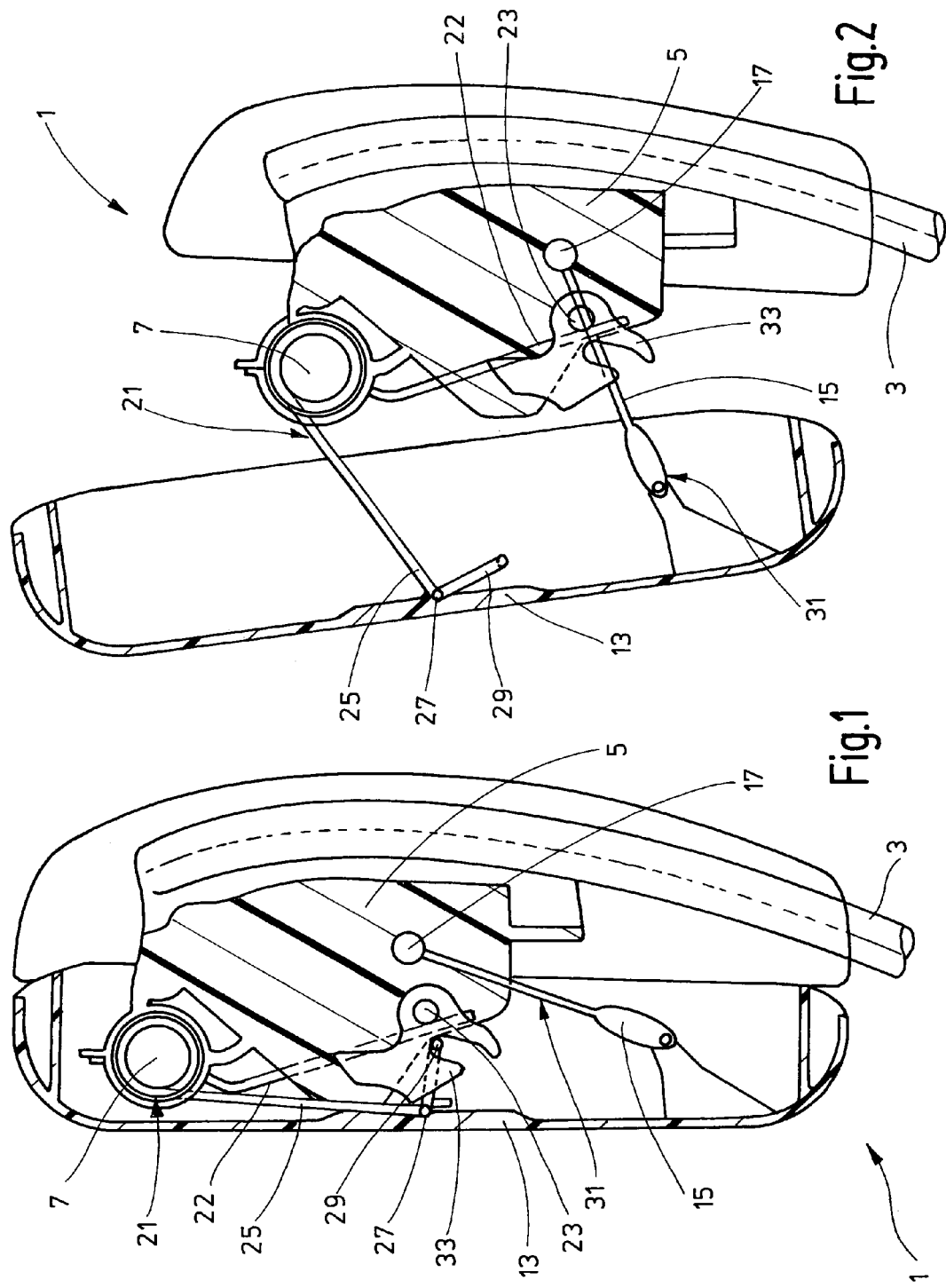

CRASH-ACTIVE HEAD RESTRAINT

CROSS-REFERENCE TO RELATED APPLICATION

The present application is a continuation of International Application PCT/EP2005/006086, which was filed Jun. 7, 2005. The entire disclosure of International Application PCT/EP2005/006086, which was filed Jun. 7, 2005, is incorporated herein by reference.

BACKGROUND OF THE INVENTION

The present invention relates to a head restraint for a vehicle seat, with the head restraint including a support; at least two rockers which are arranged movably on the support and are pivotable about horizontal spindles; an impact element which is coupled to the rockers and, with the rockers and the support, forms at least one four-bar linkage; and a spring as an energy accumulator which drives the four-bar linkage in the event of a crash, so that the impact element extends forward out of a starting position into a crash position DE 199 51 966 A1 discloses a head restraint of the type described immediately above, in which the impact element extends in the event of a crash by means of a four-bar linkage designed as a parallelogram, and a spring-loaded pivoting arm, which serves as the drive, acts upon the impact element and locks in the crash position.

BRIEF SUMMARY OF SOME ASPECTS OF THE INVENTION

An aspect of the present invention is the provision of improvements to a head restraint of the type mentioned above. In accordance with an aspect of the present invention, the head restraint includes a support; at least two rockers (e.g., pivotable members) that are carried by the support for respectively pivoting about horizontal axes (e.g., spindles of the support); an impact element that is connected to the rockers so that the impact element together with the rockers and the support forms at least one four-bar linkage; and a spring that is for accumulating energy and for driving the four-bar linkage in response to a crash, so that the impact element moves forwardly from a starting position to a crash position, wherein the spring includes at least one leg, and the leg is one of the rockers.

Because at least one leg of the spring forms one of the rockers, the number of required components is reduced, which reduces the production costs and simplifies the installation. The functionality of the crash-active head restraint remains unaffected in this case. The arrangement of the leg corresponds essentially to that of a rocker, i.e. the leg preferably protrudes radially from the associated spindle of the support. The spring is preferably partially wound up onto this spindle or itself forms the spindle by the spring being fixed in the support. The connection of the spring to the impact element takes place, for example, by means of a bent portion, shoulder or the like which then runs partially parallel to the spindle. The locking in the starting position takes place, for example, by means of an intercepting tongue, bent portion or the like which is held by a latch of the support.

The spring is preferably formed integrally from a continuous spring steel wire and is constructed symmetrically with respect to the center of the head restraint, which is defined by a vertical plane, in order to achieve a symmetrical drive. The leg serving as the rocker is then preferably provided in duplicate and is provided, for example, in a central section of the spring where the bent portion(s) and the intercepting tongue, which is preferably placed between the legs, can also be provided. The leg or legs preferably form an upper rocker, with then in total two four-bar linkages being provided, each comprising a leg, a lower rocker and also the impact element and the support.

Other aspects and advantages of the present invention will become apparent from the following.

BRIEF DESCRIPTION OF THE DRAWINGS

The invention is explained in more detail below with reference to an exemplary embodiment illustrated in the drawings, in which:

FIG. 1 shows a side view of the exemplary embodiment in the starting position, and FIG. 2 shows a view corresponding to FIG. 1 in the crash position.

DETAILED DESCRIPTION OF EXEMPLARY EMBODIMENT

In the exemplary embodiment, a head restraint 1 for a vehicle seat of a motor vehicle is provided. The head restraint 1 can be adjusted in terms of its height by means of two parallel head restraint rods 3 that are mounted displaceably in the backrest of the vehicle seat. The arrangement of the head restraint 1 on the vehicle seat and the usual direction of travel of the motor vehicle define the directional details used. The head restraint rods 3 are fixedly secured at their upper ends in a support 5 arranged transversely with respect to the head restraint rods 3. At the upper end of the support 5, a horizontally arranged spindle 7 running transversely with respect to the head restraint rods 3 is defined in the support 5. In the exemplary embodiment, the spindle 7 can be characterized as only being present mathematically (e.g., it can be characterized as being not physically present), but the spindle 7 can be physically present in a modified embodiment. The head restraint 1 is constructed essentially symmetrically with respect to a vertical central plane.

An impact element 13 is arranged in front of the support 5 in the direction of travel. A cushion part is arranged on the impact element 13, with it being possible for the impact element 13 at the same time to be the cushion carrier, i.e. the cushion can be fastened directly to the impact element 13. A pair of lower rockers 15 (e.g., pivotable members) of elongate design are coupled at one end to the support 5 in each case by means of a horizontal pivot/bearing bolt 17 which is parallel to the spindle 7. The other ends of the lower rockers 15 are coupled to the lower end of the impact element 13. A double leg spring 21, which is formed symmetrically with respect to a center of the head restraint 1, which center is defined by a vertical plane, serves as an energy accumulator and is formed from a continuous spring steel wire. Starting from the center of the head restraint 1, the double leg spring 21 is supported by a respective end section 22 on a metallic, cylindrical transverse rod 23 which is mounted in the support 5 parallel to the spindle 7. Each end section 22, which runs radially towards the spindle 7 from the transverse rod 23, is adjoined laterally towards the outside by a respective winding section wound helically around the spindle 7. The outer ends of the two winding sections are connected to a common, U-shaped bow section by means of which the double leg spring 21 acts upon the impact element 13. The bow section comprises two legs 25 (e.g., pivotable members) which protrude radially from the spindle 7 and form the outer ends of the double leg spring 21, a respective bent portion 27 which runs towards the center of the head restraint 1 in a manner largely parallel to the spindle 7 and to which the impact element 13 is attached, and an intercepting tongue 29 in the center. The support 5, in each case one leg 25, the impact element 13, and the respective lower rocker 15 in each case form a four-bar linkage 31.

The double leg spring 21 is held in the starting position by a latch 33; the latch 33 has a latch mouth that receives the intercepting tongue 29. As a projection from the central plane, the intercepting tongue 29 runs approximately perpendicularly to the legs 25. The latch 33 is mounted pivotably on the transverse rod 23. The latch 33 is prestressed in relation to the support 5 in the opening direction by means of a spring which is weak in comparison to the double leg spring 21. The latch 33 is held by a lever mechanism (not shown in the drawings) and ultimately by a magnet system.

In the event of a rear-end crash, an electromagnet of the magnet system receives a pulse and releases the lever mechanism which releases the latch 33. As a result, the relaxing double leg spring 21 can press the impact element 13 forward and at the same time can open the latch 33. This triggers the crash-active head restraint 1. With the four-bar linkages 29 extending, the impact element 13 "shoots" forward into a crash position.

The crash-active head restraint can be reset after a crash, i.e. can be brought reversibly into the starting position. For this purpose, a tool (not shown in the drawings) is introduced into the support 5 and the lever mechanism reset. By means of manual pressure from the front against the impact element 13, preferably using both hands, the impact element 13 can then be moved rearwards again, counter to the force of the double leg spring 25, towards the latch 33 which is ready to receive it. As soon as the intercepting tongue 29 comes to bear against the latch 33, the latch 33 is rotated into its starting position and is held there. In a modified embodiment, first of all the impact element 13 can be pressed back and then the lever mechanism can be reset.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A head restraint that is for a vehicle seat and capable of operating advantageously in response to a crash, the head restraint comprising:
   a support;
   at least two pivotable members that are carried by the support for respectively pivoting about horizontal axes;
   an impact element that is connected to the pivotable members so that the impact element together with the pivotable members and the support forms at least one four-bar linkage; and
   a spring that is for accumulating energy and for driving said four-bar linkage in response to the crash, wherein the head restraint is configured so that the impact element will move forwardly, from a starting position to a crash position, in response to said four-bar linkage being driven by the spring, and
   the spring includes at least one leg, and the leg of the spring is one of the pivotable members of said four-bar linkage, so that said four-bar linkage is formed by
   (a) the support,
   (b) the leg of the spring being carried by the support for pivoting relative to the support about a first of the horizontal axes,
   (c) a second of the pivotable members being carried by the support for pivoting relative to the support about a second of the horizontal axes,
   (d) the impact element being pivotably connected to the leg of the spring, and
   (e) the impact element being pivotably connected to the second pivotable member at a position that is distant from where the impact element is pivotably connected to the leg of the spring.

2. The head restraint as claimed in claim 1, wherein the leg of the spring protrudes radially from the first axis.

3. The head restraint as claimed in claim 2, wherein the leg is an outer portion of the spring.

4. The head restraint as claimed in claim 2, wherein the spring has a bent portion, the bent portion of the spring is connected to the leg of the spring, the bent portion of the spring is fastened to the impact element, and the impact element is pivotably connected to the leg of the spring by way of the bent portion of the spring being fastened to the impact element.

5. The head restraint as claimed in claim 2, wherein:
   the spring has an intercepting tongue;
   the intercepting tongue is held by a latch while the impact element is in the starting position; and
   the latch is mounted on the support.

6. The head restraint as claimed in claim 2, wherein the leg of the spring is positioned above the second pivotable member, whereby the leg of the spring is an upper pivotable member of said four-bar linkage, and the second pivotable member is a lower pivotable member of said four-bar linkage.

7. The head restraint as claimed in claim 2, wherein:
   the leg of the spring is a first leg,
   the spring includes a second leg, and
   the first and second legs of the spring are arranged symmetrically with respect to a center of the head restraint.

8. The head restraint as claimed in claim 2, wherein the spring is a continuous piece of spring steel wire.

9. The head restraint as claimed in claim 2, wherein another leg of the spring is at least partially supported on a metallic transverse rod, and the transverse rod is carried by the support.

10. The head restraint as claimed in claim 1, wherein the leg of the spring is an outer portion of the spring.

11. The head restraint as claimed in claim 10, wherein the spring has a bent portion, the bent portion of the spring is connected to the leg of the spring, the bent portion of the spring is fastened to the impact element, and the impact element is pivotably connected to the leg of the spring by way of the bent portion of the spring being fastened to the impact element.

12. The head restraint as claimed in claim 1, wherein the spring has a bent portion, the bent portion of the spring is connected to the leg of the spring, the bent portion of the spring is fastened to the impact element, and the impact element is pivotably connected to the leg of the spring by way of the bent portion of the spring being fastened to the impact element.

13. The head restraint as claimed in claim 12, wherein the spring is a continuous piece of spring steel wire.

14. The head restraint as claimed in claim 1, wherein:
   the spring has an intercepting tongue;

the intercepting tongue is held by a latch while the impact element is in the starting position; and the latch is mounted on the support.

15. The head restraint as claimed in claim 14, wherein:

the leg of the spring is a first leg, the spring includes a second leg, the first and second legs of the spring are arranged symmetrically with respect to a center of the head restraint, and the intercepting tongue is positioned between the first and second legs.

16. The head restraint as claimed in claim 14, wherein the spring is a continuous piece of spring steel wire.

17. The head restraint as claimed in claim 1, wherein the leg of the spring is positioned above the second pivotable member, whereby the leg of the spring is an upper pivotable member of said four-bar linkage, and the second pivotable member is a lower pivotable member of said four-bar linkage.

18. The head restraint as claimed in claim 17, wherein:

the leg of the spring is a first leg, the spring includes a second leg, the first and second legs of the spring are arranged symmetrically with respect to a center of the head restraint, said four-bar linkage is a first four-bar linkage, and a second four-bar linkage includes the second leg of the spring, the impact element, the support, and a lower pivotable member that is carried by the support.

19. The head restraint as claimed in claim 18, wherein the spring is a continuous piece of spring steel wire.

20. The head restraint as claimed in claim 1, wherein:

the leg of the spring is a first leg, the spring includes a second leg, and the first and second legs of the spring are arranged symmetrically with respect to a center of the head restraint.

21. The head restraint as claimed in claim 1, wherein the spring is a continuous piece of spring steel wire.

22. The head restraint as claimed in claim 1, wherein the spring is at least partially supported on a metallic transverse rod, and the transverse rod is carried by the support.

* * * * *

UNITED STATES PATENT AND TRADEMARK OFFICE
CERTIFICATE OF CORRECTION

PATENT NO. : 7,344,191 B2
APPLICATION NO. : 11/655949
DATED : March 18, 2008
INVENTOR(S) : Jürgen Schilling et al.

It is certified that error appears in the above-identified patent and that said Letters Patent is hereby corrected as shown below:

In the claims:
Col. 3 line 48 thru Col. 4 line 12 replace claim 1 with the following:

1. A head restraint that is for a vehicle seat and capable of operating advantageously in response to a crash, the head restraint comprising:
a support;
at least two pivotable members that are carried by the support for respectively pivoting about horizontal axes;
an impact element that is connected to the pivotable members so that the impact element together with the pivotable members and the support forms at least one four-bar linkage; and
a spring that is for accumulating energy and for driving said four-bar linkage in response to the crash, wherein
the head restraint is configured so that the impact element will move forwardly, from a starting position to a crash position, in response to said four-bar linkage being driven by the spring, and
the spring includes at least one leg, and the leg of the spring is one of the pivotable members of said four-bar linkage, so that said four-bar linkage is formed by
(a) the support,
(b) the leg of the spring being carried by the support for pivoting relative to the support about a first of the horizontal axes,
(c) a second of the pivotable members being carried by the support for pivoting relative to the support about a second of the horizontal axes,
(d) the impact element being pivotably connected to the leg of the spring, and the impact element being pivotably connected to the second pivotable member at a position that is distant from where the impact element is pivotably connected to the leg of the spring.

Signed and Sealed this

Twenty-sixth Day of January, 2010

David J. Kappos
*Director of the United States Patent and Trademark Office*